United States Patent [19]

Badger

[11] 4,006,762
[45] Feb. 8, 1977

[54] FUEL TANK LEVEL DETECTOR AND SHUT-OFF VALVE

[75] Inventor: Everett H. Badger, La Habra, Calif.
[73] Assignee: Textron, Inc.
[22] Filed: Aug. 11, 1975
[21] Appl. No.: 603,424
[52] U.S. Cl. .............................. 141/198; 137/386
[51] Int. Cl.² ..................... B65B 3/26; B65B 57/14
[58] Field of Search ............... 137/386; 141/39, 40, 141/46, 95, 198, 206-229, 301, 302, 346–350; 251/367, 368

[56] References Cited

UNITED STATES PATENTS 3,811,486   5/1974   Wood ................................. 141/208

Primary Examiner—Richard E. Aegerter
Assistant Examiner—Frederick R. Schmidt
Attorney, Agent, or Firm—Nilsson Robbins Dalgarn & Berliner

[57] ABSTRACT

A system for controlling the liquid level in a tank such as a fuel tank. The system includes a main inlet valve and a jet level sensor mechanism. Redundant relay valves which are fluid-pressure responsive are interconnected between the inlet valve and the jet level sensor to cause the inlet valve to shut off when the fluid within the tank reaches a pre-determined level. The inlet of the jet level sensor is connected through a pair of shut-off valves to the inlet valve to thus provide a source of liquid to flow through the jet level sensor. The shut-off valves are connected to be responsive to an over pressure condition which might exist in the tank which is being filled or an over pressure condition at the inlet resultant from excessive fluid pressure at the source thereof.

The liquid level control system is modularized by providing a plurality of plate members formed of molded plastic. Each of the plate members is constructed in such a way as to provide the various porting and interconnection between the valves and the jets. A common diaphragm member is utilized for each of the pressure-responsive valves with one side of the diaphragm being connected in the case of each of the valves to a different fluid pressure source for operation thereof.

14 Claims, 8 Drawing Figures

FUEL TANK LEVEL DETECTOR AND SHUT-OFF VALVE

BACKGROUND OF THE INVENTION

It has long been desirable to control the level of liquid particularly in fuel tanks of the type normally incorporated in aircraft. Such automatic level control systems normally will preclude overflow of the fuel tank with all the attendant disadvantages thereof such as fire hazard, waste of fuel, bad odors, and the like. Various types of systems have been developed to accomplish the desired level control such as traditional float-operated mechanisms or jet level sensor systems or diaphragm-operated valve systems. Typical level-controlled systems known to applicant are exemplified by the U.S. Pat. Nos. 2,731,029; 3,495,634; 3,561,465; and 3,732,902. While each of the systems disclosed in the prior art operate effectively under certain conditions there are various disadvantages existent associated with each of such prior-art systems.

Where a float-operated pilot valve is utilized such necessitates a relatively complex mechanical system which requires a large amount of space and complex adjustments to effect proper operation. As a result, such systems are usually expensive, large, bulky and in some cases inaccurate.

Prior-art systems known to applicant utilizing jet level sensors have been unsatisfactory in that utilization of the jet sensor has created fuel leakage into the tank even under those circumstances where a tank over pressure has dictated a shut-off of the fuel supply. Where such leakage does continue it could result in tank rupture. In addition thereto, jet level sensors have in the past been subject to unreliable operation resulting from contaminants in the fluid which tended to block the jet orifice thereby giving a false signal representative of the tank being filled with fluid when such in fact was not the case.

Diaphragm-operated valves have been subject to many of the unsatisfactory disadvantages referred to with regard to the float-operated valves above.

SUMMARY OF THE INVENTION

There is provided a liquid-level control system including an inlet valve and a jet level sensing means. A flow of liquid to the inlet of said jet level sensing means is provided by connecting the inlet valve thereto. Pressure-responsive valve means is provided and connected between the output of the jet level sensing means and the inlet valve to cause the inlet valve to close in the absence of an output signal from the jet level sensing means. Further pressure-responsive valve means is connected in the line providing the fluid flow supply to the input of the jet level sensing means which pressure-responsive valve means is responsive to a pre-determined over-pressure condition in the system thereby precluding fluid flow to the jet in the presence of such over-pressure condition.

In accordance with a more specific feature of the invention, the pressure-responsive valve means are provided through utilization of a plurality of molded plastic plates stacked one on the other and further includes a common diaphragm means for operation of the valve means.

DESCRIPTION OF THE EMBODIMENT OF THE SYSTEM

Figure 1:
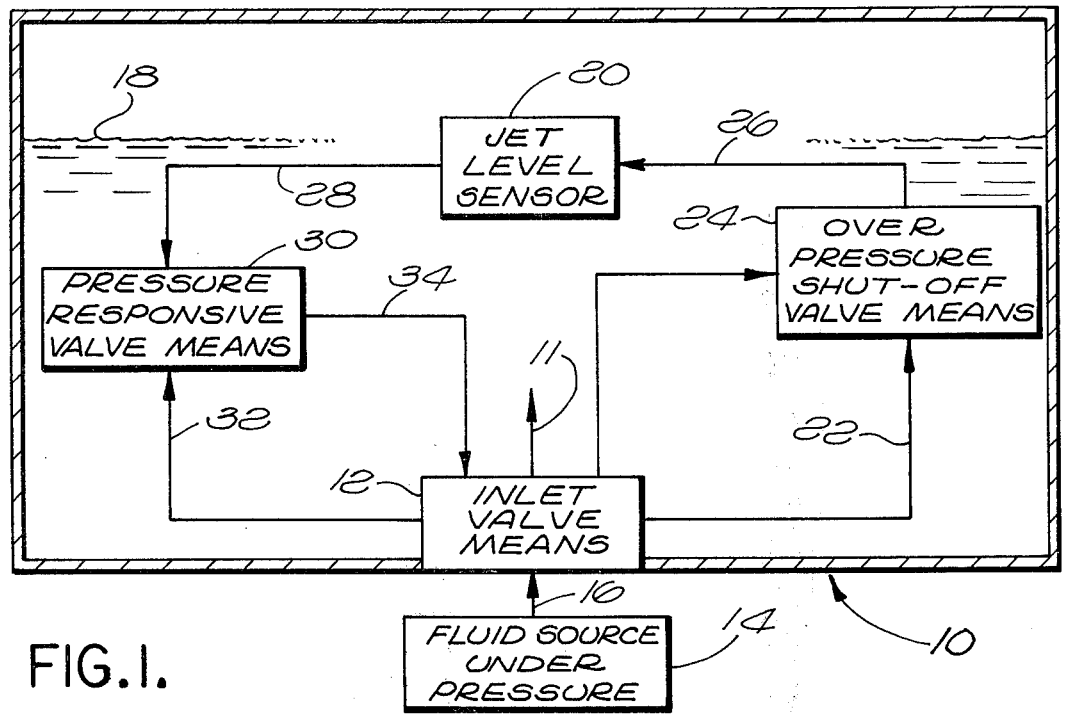
FIG. 1 is a schematic diagram in block form illustrative of a liquid-level control system in accordance with the present invention.

Referring to FIG. 1, there is generally shown a system in accordance with the present invention. The system is housed within a tank 10 which has an inlet valve means 12 associated therewith. A source of fluid under pressure 14 such as gasoline is connected as is indicated by the conduit 16 to the inlet valve means to refuel or refill the tank 10 as is well known. Under typical operation the fuel flows through the inlet valve means 12 and into the interior of the tank 10 as shown by the arrow 11 for such a time as required to reach a pre-determined level within the tank such as shown at 18. A jet level sensor means 20 is operative to detect the moment when the fuel level reaches the desired position 18 within the tank and to effect closure of the inlet valve 12 in response thereto.

The source of fluid for operation of the jet level sensor 20 is obtained from the inlet valve means 12 by means of the connection 22 through the over-pressure shut-off valve means 24 and the connection 26 to the jet level sensor 20. So long as the level of fuel within the tank is below the desired level 18 fluid flows from the inlet to the outlet of the jet level sensor 20 and through the connection 28 to a pressure-responsive valve means 30. The valve means 30 is operative to maintain the inlet valve means in an open condition so long as the jet level sensor 20 is operative with a pressure signal in the conduit 28.

When the level of fuel reaches the desired level 18 in the tank 10 the flow of fluid between the inlet and outlet of the jet level sensor 20 is interrupted thus interrupting the pressure signal present in the conduit 28. When such signal is no longer present, the inlet valve means 12 closes thus shutting off the flow of fluid from the source 14 into the tank 10. Such closing of the inlet valve means 12 is accomplished by the provision of a pressure signal from the inlet valve means 12 over the conduit 32 through the pressure-responsive valve means 30 and the conduit 34 back to the inlet valve means 12.

Figure 2:
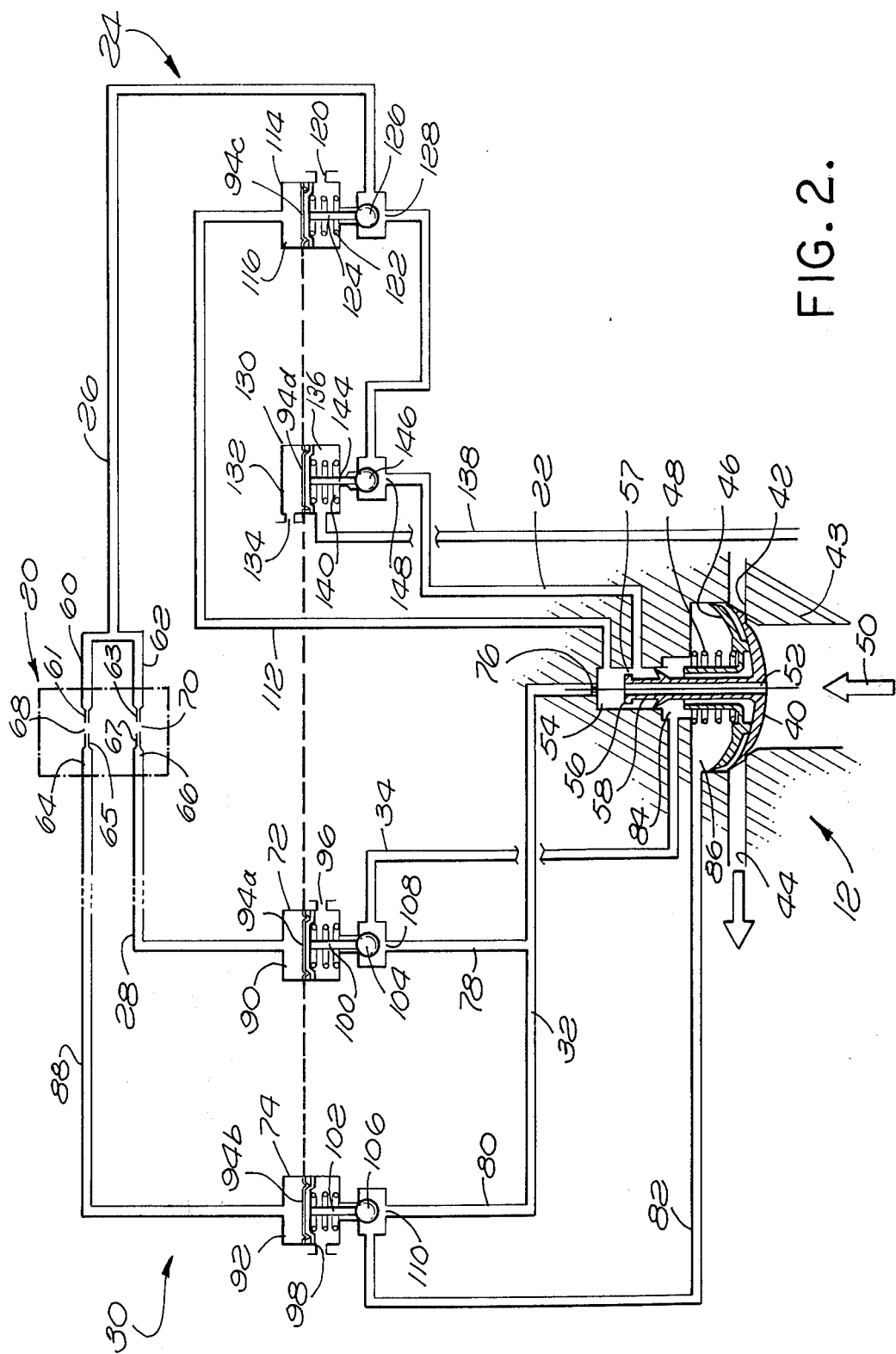
FIG. 2 is a schematic diagram showing the system of FIG. 1 in further detail.

Referring now more particularly to FIG. 2, the level-control system in accordance with the present invention is schematically illustrated but in greater detail than is the case with respect to FIG. 1. As is illustrated in FIG. 2 the inlet valve 12 includes a primary shut-off poppet 40 which cooperates with a seat 42 formed in a base 43 to thereby close the inlet valve and block the flow of fluid therethrough and into the tank 10 by way of the outlet 44. Cooperating with the primary shut-off poppet 40 is a secondary shut-off poppet 46. A spring means 48 continuously urges the inlet valve shut-off poppets toward the closed position as illustrated in FIG. 2. The fuel is supplied from the source 14 and typically from a nozzle to the inlet as is illustrated by the arrow 50 and is as well understood in the prior art.

The primary poppet 40 defines an opening 52 axially thereof and through which fluid is permitted to flow. The fluid flowing through the opening 52 enters the chamber 54 and from there is fed to the jet level sensor and relay valves for operation of the inlet valve 12 as will be more fully described hereinbelow.

An orifice 57 is defined by the outwardly protruding flange 56 on the stem 58 of the poppet 40 and the wall of the chamber 54. This orifice 57 controls the contaminant level in the fluid passing to the jets. In addition the orifice functions as a dropping orifice and maintains a pre-determined pressure range for the fluid in the conduits 22–26 which are connected to the jet level sensor 20. As will be noted the orifice 57 formed by flange 56 is dynamic in that the flange 56 moves within the chamber 54 as the primary shut-off poppet is caused to move. Such movement renders the orifice 56 self-cleaning in that it precludes the collection of any foreign matter that might be contained in the fluid and which may otherwise cause blockage of an orifice.

As fluid flows through the conduits 22–26 it enters the bifurcated inlet 60–62 of the jet level sensor 20. A bifurcated outlet 64–66 is also provided with each of the outlets being axially aligned with the inlets 60–62. Thus, there is provided two jet ejectors 61 and 63 and two jet receivers 65 and 67 in the jet level sensor 20. The space between the jet ejectors and the receivers as illustrated at 68 and 70 is open to the interior of the tank 10. When the liquid level within the tank fills the space 68–70 fluid is no longer capable of flowing between the ejectors 61–63 and the receivers 65–67, respectively, of the jet level sensor 20. In this fashion the sensor 20 detects when the fluid within the tank has reached the pre-determined desired level.

When there is no fluid flow into the jet receivers 65–67 of the fluid level sensor 20, the pressure-responsive valve means 30 is in the position as illustrated in FIG. 2. In the preferred embodiment the valve 30 constitutes a primary and secondary relay 72 and 74, respectively. Under these conditions fluid under pressure in the chamber 54 passes through the restriction orifice 76 and the conduit 32 to the relays 72 and 74. The restriction orifice 76 eliminates surge conditions which would otherwise occur at the inlet valve 12. The fluid under pressure in the conduit 32 flows through the conduits 78 and 80 and through the relays 72 and 74 and then through the conduits 34 and 82 to the chambers 84 and 86, respectively. The pressures appearing in the chambers 84 and 86 provide a force on the primary and secondary shut-off poppets 40 and 46 causing them to move toward the closed position as illustrated in FIG. 2. At the normal operating pressures of the system and with the sizing of the poppets 40–46, sufficient force is generated by pressure appearing in either chamber 84 or 86 to effect closure of the inlet valve 12. Thus, a redundancy is provided to protect against inadvertent failure of one of the jets for any reason.

When fluid is flowing through the jet sensor means 20 in an interrupted fashion a pressure signal appears in the conduits 28 and 88. This pressure signal is present in the chambers 90 and 92 of the relays 72 and 74, respectively. The pressure appearing in the chamber 90 creates a differential pressure across the diaphragm 94a therein as does the pressure in the chamber 92 across the diaphragm 94b in the relay 74. The opposite side of the diaphragm in each case is vented to the interior of the tank as illustrated by the openings 96 and 98. Differential pressure thus causes the pistons 100 and 102 in the relays 72 and 74, respectively, to move downwardly, as viewed in FIG. 2, thus moving the ball valves 104 and 106, respectively, to close the ports 108 and 110, respectively. With the ports 108 and 110 closed, the fluid pressure signal appearing in the conduit 32 is removed from the chambers 84 and 86. As a result, the fluid pressure from the source 14 operates upon the forward surface of the primary shut-off poppet causing it to move against the force of the spring 48, upwardly as viewed in FIG. 2, thereby allowing fuel to flow through the outlet 44 into the tank.

In the event the fuel pressure at the inlet, or from the source 14, becomes too great such that damage could be done to the fuel level control apparatus or to the tank, means is provided to shut off the inlet valve means thereby protecting the system. Conduit means 112 is connected to a nozzle over-pressure shut-off valve 114 which includes a chamber 116 with a diaphragm 94c exposed thereto. The opposite side of the diaphragm 94c is vented to tank as shown by the opening 120. Spring means 122 maintains a piston 124 in the position illustrated in FIG. 2 so that pressure within conduit 22 maintains a ball valve 126 in the position shown. While in this position fluid may flow through the conduit 26 to the jet level sensor 20 as above described. However, in the event the nozzle pressure becomes too large, and above that established by the spring force of the spring 122, the pressure appearing in the chamber 116 of the shut-off valve 114 moves the piston 124 downwardly, as viewed in FIG. 2, thus placing the ball valve so as to block the port 128 thereby precluding the flow of fluid to the jet level sensor 20. When such occurs the ball valves 104 and 106 return to the position illustrated in FIG. 2 thereby immediately causing the primary and secondary shut-off poppets to move to the closed position as illustrated in FIG. 2 and as above described. So long as the nozzle pressure remains in excess of that desired, the nozzle over-pressure shut-off valve 114 will remain operated thereby precluding further entry of fuel into the tank.

Under certain circumstances the pressure present internally of the fuel tank will become great enough potentially to rupture the tank. Under these circumstances provision need be made to preclude further flow of fuel into the fuel tank. To provide such protection there is provided a tank over-pressure shut-off valve 130. Valve 130 is constructed as is the valve 114 except that the chamber 132 thereof is vented to the tank as is illustrated at 134 with the opposite chamber 136 being vented to atmosphere through the conduit 138. When the pressure in chamber 134 exceeds a pre-determined designed pressure as established by the spring 140, the differential pressure across the diaphragm 94d moves the piston 144 downwardly, as viewed in FIG. 2, thus causing the ball valve 146 to close the port 148 thereby interrupting the flow of fluid through the conduit 22 and to the jet level sensor 20.

Again so long as the tank pressure exceeds the predetermined design limit the ball valve 146 remains in the closed position thus precluding all leakage of fluid into the tank through the jets 60 and 62.

The diaphragms 94a, 94b, 94c, and 94d are all formed of the same unitary diaphragm member as is shown by the dashed lines interconnecting the same. As will further be noted and hereinafter more fully described the various valves utilized to control the position of the inlet valve means are constructed from molded plastic members stacked one on the other, and the diaphragm is secured between these plates. Different pressure signals may be applied to pre-selected portions thereof to accomplish the operation as above described.

Figure 3:
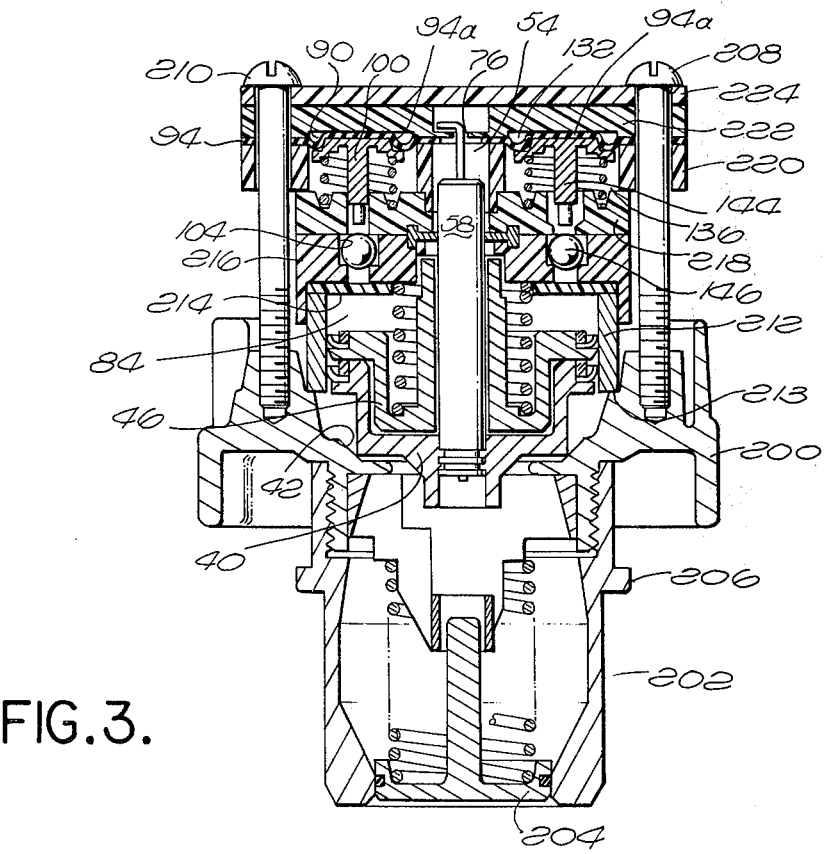
FIG. 3 is a cross-sectional view illustrating a modular construction of a liquid-level control system of the present invention.

By referring now more specifically to FIG. 3, there is therein illustrated in cross-section the assemblage of the various parts of the system as illustrated schematically in FIG. 2 (except for the jet sensor 20) constructed by utilizing the molded plastic plates stacked one on the other. In addition thereto the inlet valve is assembled therewith in operative relationship, with the entire module being mounted upon an appropriate base utilized as part of a fuel receiver in a typical aircraft fuel tank.

For purposes of clarity and ease of understanding the same reference numerals have been utilized in FIG. 3 which represent the various portions of the system as schematically illustrated in FIG. 2 and as above described.

The apparatus as illustrated in FIG. 3 is shown in a condition wherein no fluid pressure is applied and with the plate 224 position uppermost.

A base 200 is provided to which there is threadably attached a nipple 202 within which there is housed a nipple poppet 204. The nipple 202 includes a flange 206 to which a nozzle for refueling purposes is affixed as is well known in the art. Such nozzle is not illustrated and such forms no part of the present invention. A liquid level control system constructed in accordance with the present invention is affixed to the opposite side of the base 200, for example, by the bolts 208 and 210.

The liquid-level sensing and shut-off system of the present invention includes the poppets 40 and 46. The poppet 40 cooperates with the seat 42 formed as part of the base 200. The outer periphery of the poppets 40 and 46 form a seal with a cylinder 212 which is received upon a shoulder 213 formed as part of the base 200. The cooperation of the cylinder 212 with the base 200 serves to properly center and locate the module forming the system of the present invention thereon. A plurality of molded plastic plates 214 through 224 are stacked one upon the other and are positioned in place upon the cylinder 212 and held there and in cooperative relationship with the base 200 by the fastening means 208-210 as above described. The diaphragm 94 is sandwiched between the plates 220 and 222 to provide a sensing mechanism for the pressure-responsive valve means 30 and the over-pressure shut-off valve means 24 as illustrated in FIGS. 1 and 2 and above described. Specifically, in FIG. 3 the primary relay 72 and the tank over-pressure shut-off valve 130 are illustrated. The secondary relay and the nozzle over-pressure shut-off are identical in structure with the exception of porting which is not illustrated in FIG. 3. As will be appreciated by those skilled in the art, each of the molded plastic plates 214 through 224 may be provided with appropriate passage ways and porting to interconnect various components of the system in accordance with the schematic as illustrated in FIG. 2 and as above described. A better understanding of the construction of the plastic plates will be appreciated by reference to FIGS. 4 and 5.

Figure 4:
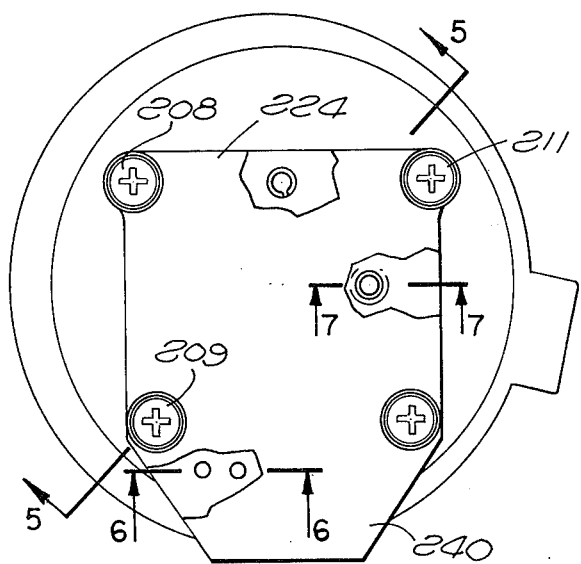
FIG. 4 is a top plan view of the system as shown in FIG. 3 partially broken away to show alignment details.

As is shown in FIG. 4 the plate 224 is held in position upon the base 200 of FIG. 3 by four bolts 208, 210, 209, and 211. Plate 224 includes an extension 240, as does some of the remainder of the plates, and under some applications of the system in accordance with the present invention the jets may be housed within this extension 240. For a better understanding of the manner in which the plates are constructed and are assembled reference is made to FIG. 5 which is an exploded cross-sectional view of the plates taken about the line 5—5 of FIG. 4.

Figure 7:
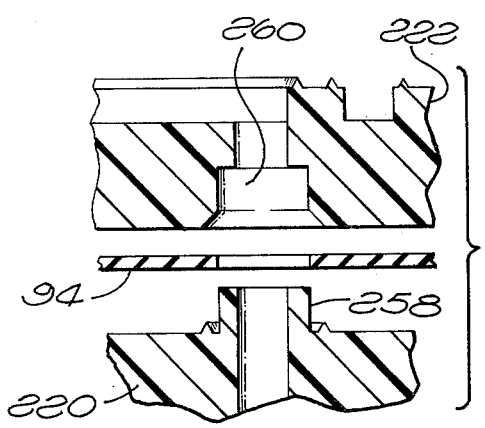
Figure 5:
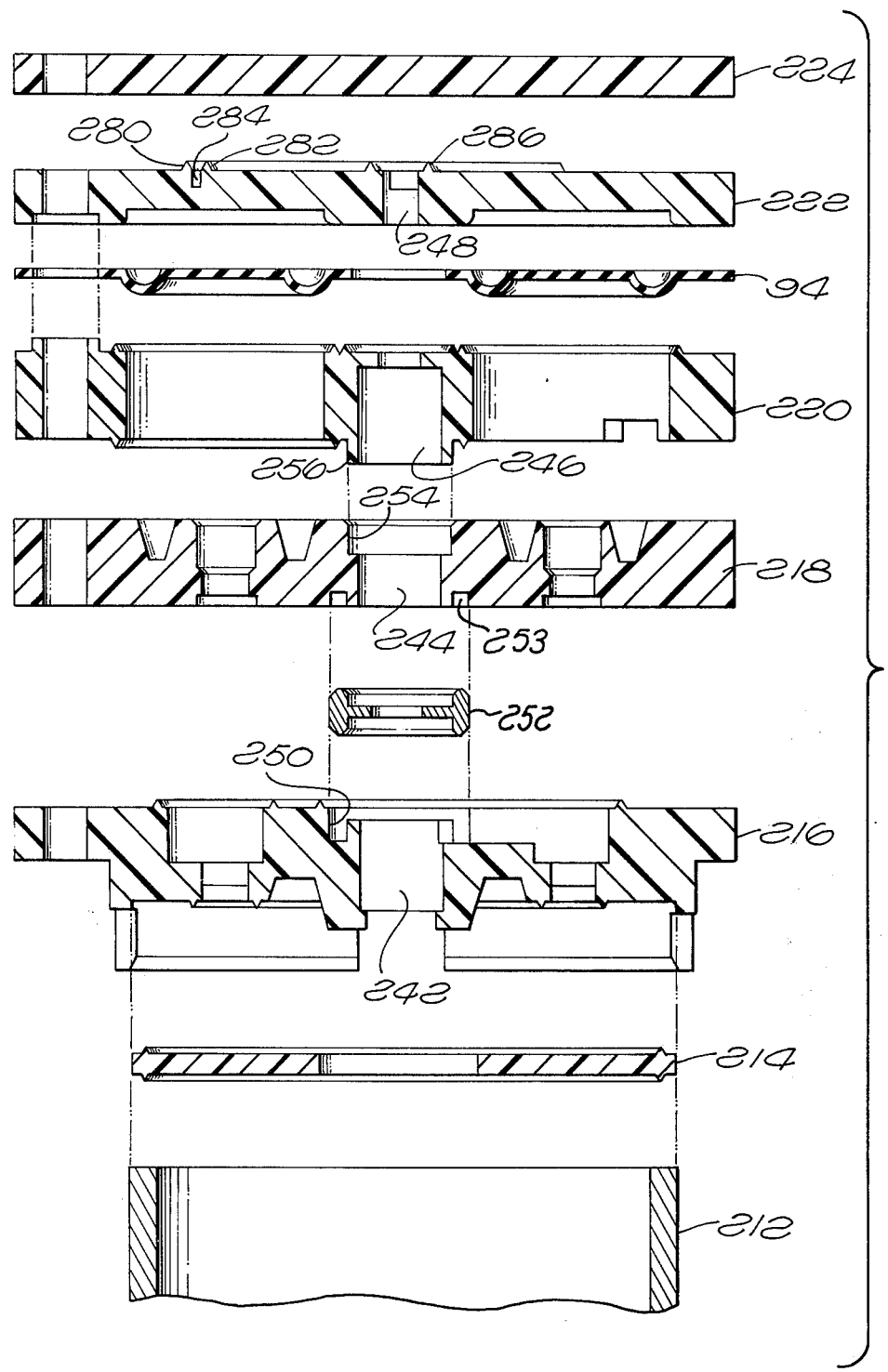
FIG. 5 is an exploded view in cross section taken about the line 5-5 of FIG. 4 illustrating portions of the system as shown in FIG. 3.

As is shown in FIG. 5, the plates 216–222 each include a central aperture 242 through 248. The aperture receives the stem 58 of the inlet valve 12. A recess 250 is provided in the upper surface of the plate 216. A metal insert 252 is illustrated between the plates 216 and 218 and the lower surface of the plate 218 defines a recess 253. Cooperative engagement of the insert 252 into the recesses 250 and 253 is utilized to axially align the plates 216 and 218. In addition thereto the aperture in the insert 252 functions with the stem 58 to provide the self cleaning orifice above referred to. Axial alignment provisions are also made with respect to the plates 220 and 218. To this end the aperture 244 is widened as is illustrated at 254 while a downwardly extending lip 256 is provided surrounding the aperture 246. The lip 256 extends into the widened portion 254 again axially aligning the plate 220 upon the plate 218. It will thus be recognized that upon assembly the plates are merely stacked one upon the other with these protrusions and openings appropriately seated one within the other to accomplish automatic alignment of the plates 216, 218, and 220 one upon the other. As is illustrated in FIG. 7 the plate 220 includes a protrusion 258 extending upwardly therefrom and which cooperates with an opening 260 provided in the lower surface of the plate 222. This protrusion and opening is off-set from the central aperture as is indicated in FIG. 4 at the lines 7—7 about which the view of FIG. 7 is taken. An appropriate opening is provided in the diaphragm 94 to receive the protrusion 258. In this manner by seating the opening 260 on the plate 222 over the protrusion 258 on the plate 220 the plates 222 and 220 are properly aligned one with respect to the other and with the remainder of the plates in the system. Plate 224 is properly aligned and held in place as a simple metallic cover plate by means of the screws 208, 209, 210, and 211.

Figure 6:
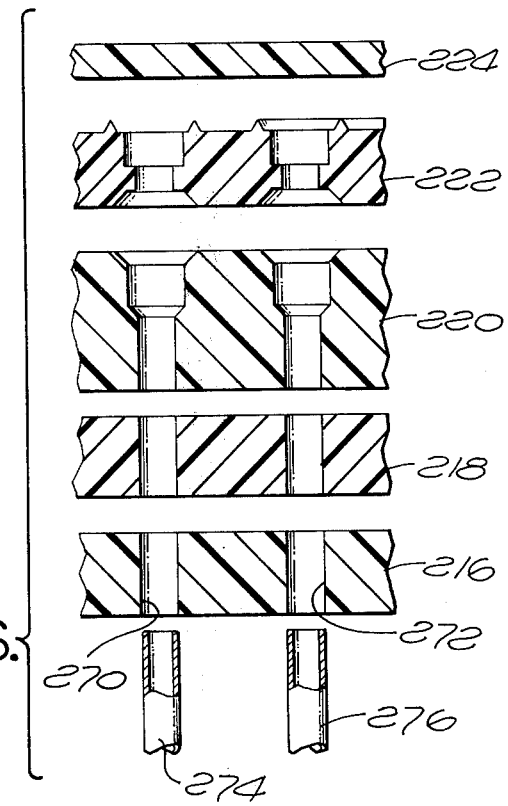
FIGS. 6 and 7 are exploded fragmentary views taken about the lines 6-6 and 7-7 of FIG. 4, respectively, illustrating the lateral alignment of the various plates of the system.

Lateral or rotational alignment for the various plates is illustrated in FIG. 6, which is taken about the line 6—6 of FIG. 4. As is illustrated in FIG. 6 the plates 216 through 222 each define openings 270 and 272 therethrough. The openings are axially aligned with respect to each other in each of the plates. A pair of alignment pins 274 and 276 are then inserted into the openings 270 and 272 for purposes of accomplishing lateral alignment of each of the plates 216 through 222. Thus, by appropriate central alignment as above described and then lateral alignment with the pins and openings as above described, the plates are all precisely and accurately aligned thus accomplishing proper registration with the ports and passageways formed therein to provide the interconnection of the system as illustrated in FIG. 2. As will be described more fully below the alignment pins 274 and 276 in a preferred embodiment of the invention are also utilized as the jet receivers or the jet sensor 20.

Alternatively the lateral or rotational alignment may be accomplished by a single pin 275 passing through the plates requiring such alignment. Where possible such a pin would also function a fluid communicating member.

As will be recognized by those skilled in the plastic molding arts it is not usually possible to obtain a perfectly flat surface on planar plastic molded parts such that when fitted together passageways formed therein would automatically seal. As a result when construction of this type is normally undertaken, machining is employed to obtain the desired surfaces and/or passageways. To avoid the machining and to utilize the plastic plates in an as molded condition seals are obtained where needed to obtain appropriate isolation and define the passageways by molding into the proper position on the surface of the appropriate plastic plate a raised bead such as is illustrated at 280 and 282 on the plate 222. The beads 280 and 282 seal a passageway 284 formed in the upper surface of the plate 222 which interconnects two ports (not shown) on the upper surface of the plate 222. An appropriate isolating bead 286 about the central aperture 248 of the plate 222 is also illustrated. Various other of the beads will be recognized by an examination of the plates as shown in FIG. 5 and it is not believed necessary to specifically describe each of the beads in detail. When the plates are assembled and the screws 208, 209, 210 and 211 are secured in place the pressure applied tends to compress the sealing beads slightly thereby effecting the desired seal between the parts irrespective of molding irregularities in the surfaces without the necessity of utilizing gaskets or machining as has been customary in the prior art.

Figure 8:
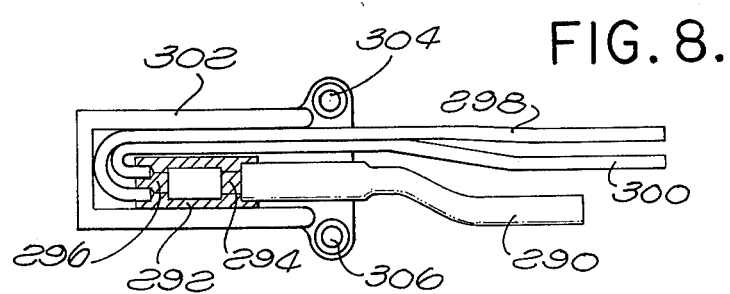
FIG. 8 is a plan view partly in cross section illustrating one form which the jets as used in the present system may take.

By referring to FIG. 8 an assembly of the jet sensors utilized in a preferred embodiment of the invention is illustrated. As is therein shown in inlet tube 290 is connected to a body 292 defining orifices in one portion 294 which function as the jet ejectors and in another portion 296 which function as the jet receivers. A pair of jet outlet tubes 298 and 300 are connected to the jet receivers. This assembly is affixed to a bracket 302 having apertures 304 and 306 to permit the assembly to be affixed at any desired position. This position may be any spot within a tank and can be included as a portion of the remainder of the system by affixing the same in the extension 240 as shown in FIG. 4. Under these circumstances the jet receiver tubes 298 and 300 will be inserted into the openings 270 and 272 as illustrated in FIG. 6 and may then also perform the dual function as the alignment pins 274 and 276.

From the foregoing discussion it will be appreciated by those skilled in the art that through the utilization of the alignment and sealing techniques as herein described an extremely low cost jet level sensor shut-off valve module can be mass produced for utilization in many applications for use particularly in all types of aircraft. Such structure will also provide capability for interchangeability of parts from module to module thus making maintenance of the system relatively simple and easy as compared to prior art structures.

What is claimed is:

1. A liquid level control system for disposition in a tank and for use in automatically shutting off liquid flow when a desired liquid level in said tank has been reached, said system comprising:
   a. inlet valve means coupled to said tank to receive liquid under pressure from a source thereof, said inlet valve means being normally closed and opened responsive to said liquid under pressure thereby to provide liquid flow through said inlet valve means directly into said tank, said inlet valve means also having means responsive to a flow of liquid in a predetermined direction to close said inlet valve means:
   b. jet level sensing means having an input and an output for detecting the level of liquid in a tank, said jet level sensing means including
      1. ejector means for providing liquid flow into said tank,
      2. receiver means spaced from said ejector means and aligned to receive said liquid flow from said ejector means thereby to provide an output liquid pressure signal from said jet level sensing means when the liquid level in said tank is below a pre-determined level, said output signal being interrupted when the liquid level in said tank is at said pre-determined level;
   c. means connecting said inlet valve means to said jet level sensing means to supply a flow of liquid to the input of said jet level sensing means;
   d. first pressure responsive valve means connected between said output of said jet level sensing means and said inlet valve, said valve means being movable from a first position into a second position responsive to said output liquid pressure signal from said jet level sensing means, and includes means to retain said valve in said first position in the absence of said output liquid pressure signal, said connection between said first valve means and said inlet valve providing flow of liquid from said source, through said first valve means when in said first position, and to said inlet valve to close said means responsive to a flow of liquid in a predetermined direction of said inlet valve; and
   e. second pressure responsive valve means disposed in said connecting means, said second valve means being movable from a first position to a second position responsive to a predetermined liquid pressure in said tank and includes means to retain said second valve means in said first position in the absence of said predetermined pressure in said tank, said second valve means when in said second position interrupting the liquid flow to said jet level sensing means thereby precluding liquid leakage into said tank through said jet level sensing means.

2. Liquid level control system as defined in claim 1 wherein said second pressure responsive valve means is connected to said inlet valve means and is responsive to over-pressure in said tank.

3. Liquid level control system as defined in claim 1 wherein said first and second pressure responsive valve means are diaphragm valves having a common member providing the diaphragm, for each of said valves.

4. Liquid level control system as defined in claim 1 wherein said jet level sensing means includes first and second jets, each having an ejector and a receiver, and said first pressure responsive valve means includes first and second diaphragm valves connected to the receivers of said first and second jets respectively.

5. Liquid level control system as defined in claim 1 wherein said connecting means includes a restriction orifice to control the pressure of liquid applied to said jet level sensing means.

6. Liquid level control system as defined in claim 1 wherein said first and second pressure responsive valve means includes a plurality of molded plastic plates stacked one on the other, each of said plates have opposed major faces.

7. Liquid level control system as defined in claim 6 which further includes common diaphragm means for said first and second pressure responsive valve means, said diaphragm means being secured between adjacent plates.

8. Liquid level control system as defined in claim 6 which further includes a base and means securing said plates to said base.

9. Liquid level control system as defined in claim 6 wherein selected ones of said molded plastic plates include sealing beads formed integrally with one major face thereof.

10. Liquid level control system as defined in claim 6 wherein selected ones of said plates define recesses in a major face thereof and selected other of said plates include protrusions extending from a major face thereof, said protrusions seating within said recesses when said plates are assembled with said major faces in opposed relationship to align said plates.

11. Liquid level control system as defined in claim 6 wherein selected ones of said plates define aligned openings therethrough and which further include alignment securing means extending through said openings to align said plates.

12. Liquid level control system as defined in claim 11 wherein said alignment securing means is a portion of said jet level sensing means.

13. Liquid level control system as defined in claim 1 wherein said jet level sensing means includes two jet ejectors and two jet receivers, each one of said ejectors being axially aligned with one of said receivers to provide redundant level sensing.

14. Liquid level control system as defined in claim 1 wherein said inlet valve means includes first and second poppet means each separately operable to effect closure of said inlet valve means.

* * * * *